(12) United States Patent
Cheng et al.

(10) Patent No.: US 11,512,860 B2
(45) Date of Patent: Nov. 29, 2022

(54) PROTECTION CIRCUIT AND AIR CONDITIONER

(71) Applicant: Qingdao Haier Air-Conditioning Electronic Co., Ltd., Qingdao (CN)

(72) Inventors: Shaojiang Cheng, Shandong (CN); Jun Wang, Shandong (CN); Benhai Yuan, Shandong (CN); Bin Shi, Shandong (CN)

(73) Assignee: QINGDAO HAIER AIR CONDITIONER GENERAL CORP., LTD., Shandong (CN)

( * ) Notice: Subject to any disclaimer, the term of this patent is extended or adjusted under 35 U.S.C. 154(b) by 601 days.

(21) Appl. No.: 16/546,235

(22) Filed: Aug. 20, 2019

(65) Prior Publication Data

US 2019/0368761 A1 Dec. 5, 2019

Related U.S. Application Data

(63) Continuation of application No. PCT/CN2018/096407, filed on Jul. 20, 2018.

(30) Foreign Application Priority Data

Aug. 1, 2017 (CN) .......................... 201710648369.7

(51) Int. Cl.
*H02H 11/00* (2006.01)
*F24F 11/32* (2018.01)
*F24F 11/49* (2018.01)

(52) U.S. Cl.
CPC .............. *F24F 11/32* (2018.01); *F24F 11/49* (2018.01); *H02H 11/00* (2013.01)

(58) Field of Classification Search
CPC .. F24F 11/32; F24F 11/49; F24F 11/88; F24F 2221/32; H02H 11/00
See application file for complete search history.

(56) References Cited

U.S. PATENT DOCUMENTS

| 5,689,395 | A | * | 11/1997 | Duffy | ..................... H02H 3/025 361/93.6 |
| 5,886,860 | A | * | 3/1999 | Chen | ..................... H02H 9/026 361/45 |
| 2010/0106313 | A1 | | 4/2010 | Grohman et al. | |

FOREIGN PATENT DOCUMENTS

| CN | 103017259 A | 4/2013 |
| CN | 206250765 U | 6/2017 |

(Continued)

OTHER PUBLICATIONS

Office Action from Chinese Application No. 201710648397 dated Apr. 23, 2019.

(Continued)

*Primary Examiner* — Bryan R Perez
(74) *Attorney, Agent, or Firm* — Calfee, Halter & Griswold LLP

(57) ABSTRACT

Embodiments of the present disclosure provide a protection circuit and an air conditioner, which are applied to the field of air conditioner technologies and used to protect an indoor unit. The protection circuit provided by the embodiments of the present disclosure includes: a positive temperature coefficient thermistor; a signal input terminal; and a communication module; wherein a first end of the positive temperature coefficient thermistor is connected to the signal input terminal, and a second end of the positive temperature coefficient thermistor is connected to the communication module.

18 Claims, 3 Drawing Sheets

(56) References Cited

FOREIGN PATENT DOCUMENTS

| CN | 107332228 A | 11/2017 |
|----|-------------|---------|
| CN | 207166134 U | 3/2018 |
| EP | 2570745 A2 | 3/2013 |
| JP | 2000013988 A | 1/2000 |
| JP | 2010185633 A | 8/2010 |

OTHER PUBLICATIONS

Office Action from Chinese Application No. 201710648397 dated Dec. 16, 2019.
Written Opinion from International Application No. PCT/CN2018/096407 dated Oct. 22, 2018.
Office Action from Chinese Application No. 201710648369.7 dated Apr. 26, 2020.
International Search Report from International Application No. PCT/CN2018/096407 dated Oct. 22, 2018.
European search report from Application No. 18841368.6 dated Feb. 18, 2020.

\* cited by examiner

PROTECTION CIRCUIT AND AIR CONDITIONER

CROSS-REFERENCE TO RELATED APPLICATIONS

This application is a Continuation of International Application No. PCT/CN2018/096407, filed Jul. 20, 2018, designating the United States, and claiming the benefit of Chinese Patent Application No. 201710648369.7, filed with the Chinese Patent Office on Aug. 1, 2017, the entire contents of which are incorporated herein by reference.

TECHNICAL FIELD

The present disclosure relates to the field of air conditioner technologies, and more particularly, to a protection circuit and an air conditioner.

BACKGROUND

An air conditioner, as an air conditioning device, has gradually become a necessity of people's daily life. During the use of the air conditioner, an indoor unit and an outdoor unit need to cooperate with each other to realize cooling and heating.

Due to the complicated installation of the air conditioner, an incorrect wiring is inevitable. Since the outdoor unit of the air conditioner may be connected to at least one indoor unit of the air conditioner, and the indoor unit needs to correctly configure a power line and a communication line, if the wiring is incorrect, a strong electrical signal of 220V/380V will be connected to the communication line, resulting in all indoor units to be completely damaged and greater economic losses.

At present, a power socket is separated from a communication socket, and wiring personnel need to identify the socket to complete wiring work. Although the incorrect wiring is reduced to some extent, if the wiring is incorrect, the indoor unit may still be damaged.

SUMMARY

Embodiments of the present disclosure provide a protection circuit and an air conditioner, which are used to protect an indoor unit.

The Embodiments of the present disclosure provide a protection circuit, including:
 a positive temperature coefficient thermistor;
 a signal input terminal; and
 a communication module;
 wherein a first end of the positive temperature coefficient thermistor is connected to the signal input terminal, and a second end of the positive temperature coefficient thermistor is connected to the communication module.

The embodiments of the present disclosure further provide an air conditioner, including: a protection circuit;
 wherein the protection circuit includes:
 a positive temperature coefficient thermistor;
 a signal input terminal; and
 a communication module;
wherein a first end of the positive temperature coefficient thermistor is connected to the signal input terminal, and a second end of the positive temperature coefficient thermistor is connected to the communication module.

BRIEF DESCRIPTION OF THE DRAWINGS

To describe technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

DETAILED DESCRIPTION

To make the objectives, technical solutions and advantages of the present disclosure clearer, the following further describes the technical solutions of the embodiments of the present disclosure in detail with reference to the accompanying drawings of the embodiments of the present disclosure. Apparently, the described embodiments are merely a part but not all of the embodiments of the present disclosure. All other embodiments obtained by those of ordinary skill in the art based on the embodiments of the present disclosure without creative efforts shall fall within the protection scope of the present disclosure.

Terms used in the embodiments of the present disclosure are merely intended to describe specific embodiments rather than limit the present disclosure. The wordings "one", "said" and "the" of the singular form used in the embodiments of the present disclosure and the appended claims are also intended to include the plural form, unless other meanings are expressly indicated in the context.

It should be understood that the term "and/or" in this specification describes only an association relationship for describing associated objects and represents that three relationships may exist. For example, A and/or B may represent the following three cases: only A exists, both A and B exist and only B exists. In addition, the character "/" in this specification generally indicates an "or" relationship between the associated objects.

Figure 1:
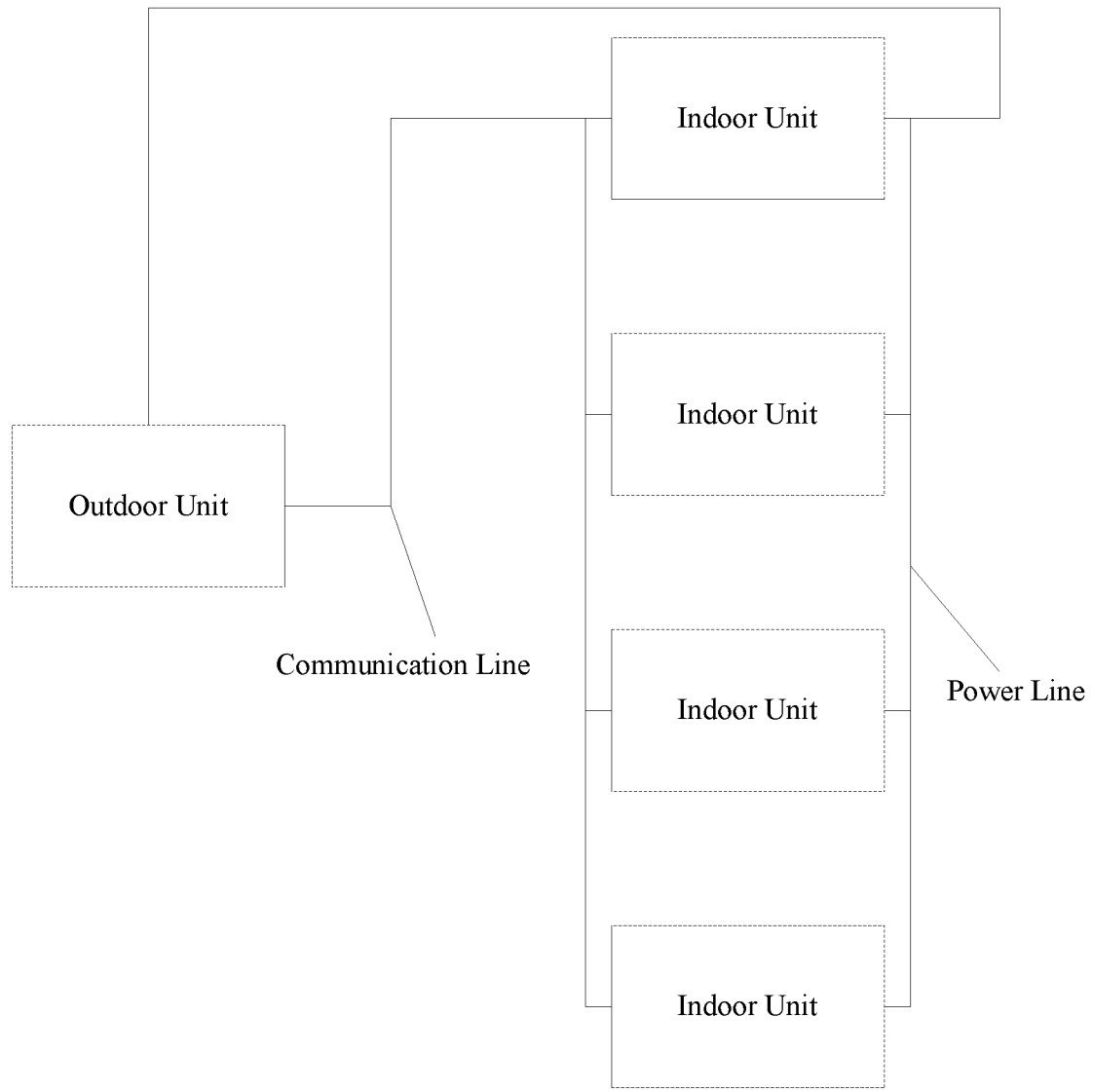
FIG. 1 is a schematic structural diagram of an air conditioner according to an embodiment of the present disclosure.
Figure 2:
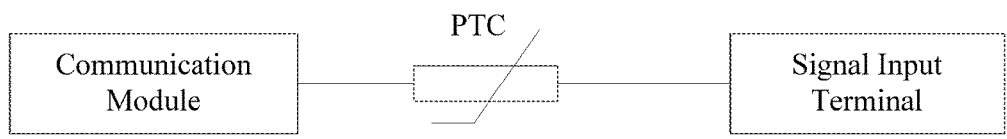
FIG. 2 is a schematic structural diagram of a protection circuit according to an embodiment of the present disclosure.

In the prior art, an air conditioner includes an indoor unit and an outdoor unit, and a communication between the indoor unit and the outdoor unit is completed through a communication line. FIG. 1 is a schematic structural diagram of an air conditioner according to an embodiment of the present disclosure. As shown in FIG. 1, multiple indoor units are connected in parallel and can communicate with the outdoor unit at the same time. Meanwhile, power lines of the outdoor unit are respectively connected to the multiple indoor units, and power is supplied to each indoor unit through the power lines. In this case, if there is a short circuit between the communication line and the power line or if the communication line and the power line are incorrectly connected, the indoor units may be damaged. Therefore, in order to solve this problem, the embodiment of the present disclosure provides a protection circuit. Specifically, FIG. 2 is a schematic structural diagram of a protection circuit according to an embodiment of the present disclosure. As shown in FIG. 2, the protection circuit in the embodiment of the present disclosure may include a positive temperature coefficient (PTC) thermistor, a signal input terminal and a communication module, wherein a first end of the positive temperature coefficient thermistor is connected to the signal input terminal, and a second end of the positive temperature coefficient thermistor is connected to the communication module.

Since the PTC thermistor is a typical temperature-sensitive semiconductor resistor, when a temperature exceeds a certain temperature (Curie temperature), a resistance value of the PTC thermistor increases stepwise with the increase of the temperature, therefore, in the embodiment of the present disclosure, when the signal input terminal is connected with the communication line, a communication signal is input, a current of the communication signal is smaller, the PTC thermistor maintains an original resistance value, which is small and will not affect a normal working of the circuit, and thus the communication module can receive the communication signal input by the signal input terminal; when the signal input terminal is connected with the power line, a power supply signal is input, a current of the power supply signal is larger, the temperature of the PTC thermistor rises, the resistance value rises sharply with the temperature, and thus the current is blocked and the communication module cannot receive the signal input by the signal input terminal, thereby protecting components of indoor unit circuits, such as the communication module.

Therefore, in the embodiments of the present disclosure, by utilizing the characteristic of the positive temperature coefficient thermistor, the power supply signal may be blocked when the wiring is incorrect, and the corresponding communication signal may be turned on when the wiring is correct, thereby protecting the indoor unit, and solving the problem that the indoor unit is damaged due to incorrect wiring in the prior art.

Figure 3:
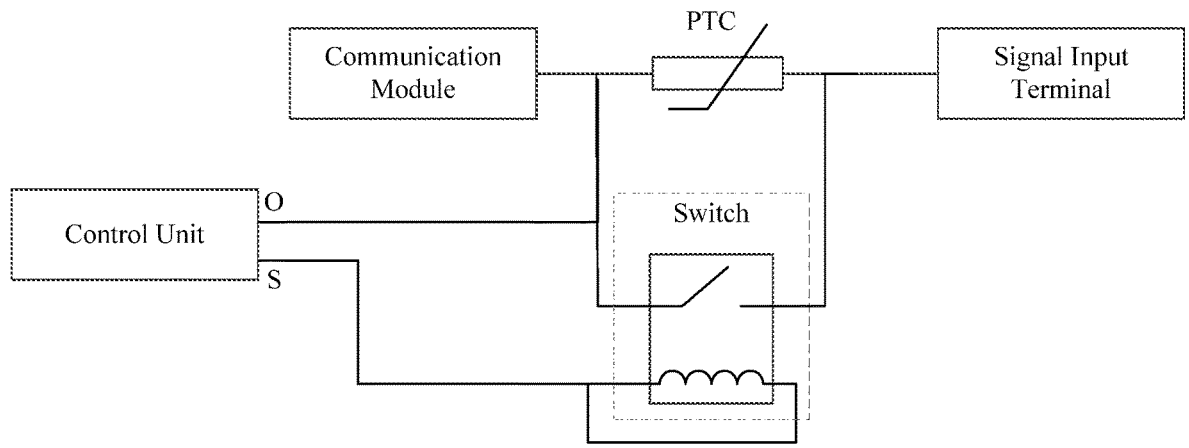
FIG. 3 is another schematic structural diagram of a protection circuit according to an embodiment of the present disclosure.

Further, since the PTC thermistor has a certain resistance value, a propagation distance of the communication signal input by the signal input terminal will be affected to a certain extent. Therefore, in the embodiment of the present disclosure, when it is determined that the indoor unit circuit is connected normally, the PTC thermistor can be shorted by using the following components. Specifically, FIG. 3 is another schematic structural diagram of a protection circuit according to an embodiment of the present disclosure. As shown in FIG. 3, the protection circuit in the embodiment of the present disclosure further includes: a control unit and a switch, wherein the control unit includes a signal detection interface O and a control signal output interface S, a first end of the switch is connected to the first end of the PTC thermistor, a second end of the switch is connected to the second end of the PTC thermistor, a third end of the switch is connected to the control signal output interface S, and the second end of the PTC thermistor is connected to the signal detection interface O.

The control unit may be a microcontroller unit (MCU) for detecting a signal in the circuit, processing the signal, and outputting a corresponding signal according to the detected signal. In the embodiment of the present disclosure, the switch may be a relay, the signal detection interface O is used for detecting a signal, and the control signal output interface S is used for outputting a control signal. When the signal detection interface O detects the communication signal, it is indicated that the signal input terminal is connected with a signal line, the control signal output interface S outputs a signal for controlling the switch to be switched on, when the switch is switched on, the PTC thermistor is shorted; when the signal detection interface O does not detect the communication signal, it is indicated that the signal input terminal is connected with the power line, at this time, it is necessary to ensure that the PTC thermistor works normally, the control signal output interface S outputs a signal for controlling the switch to be switched off, the PTC thermistor works normally to block the power supply signal.

Figure 4:
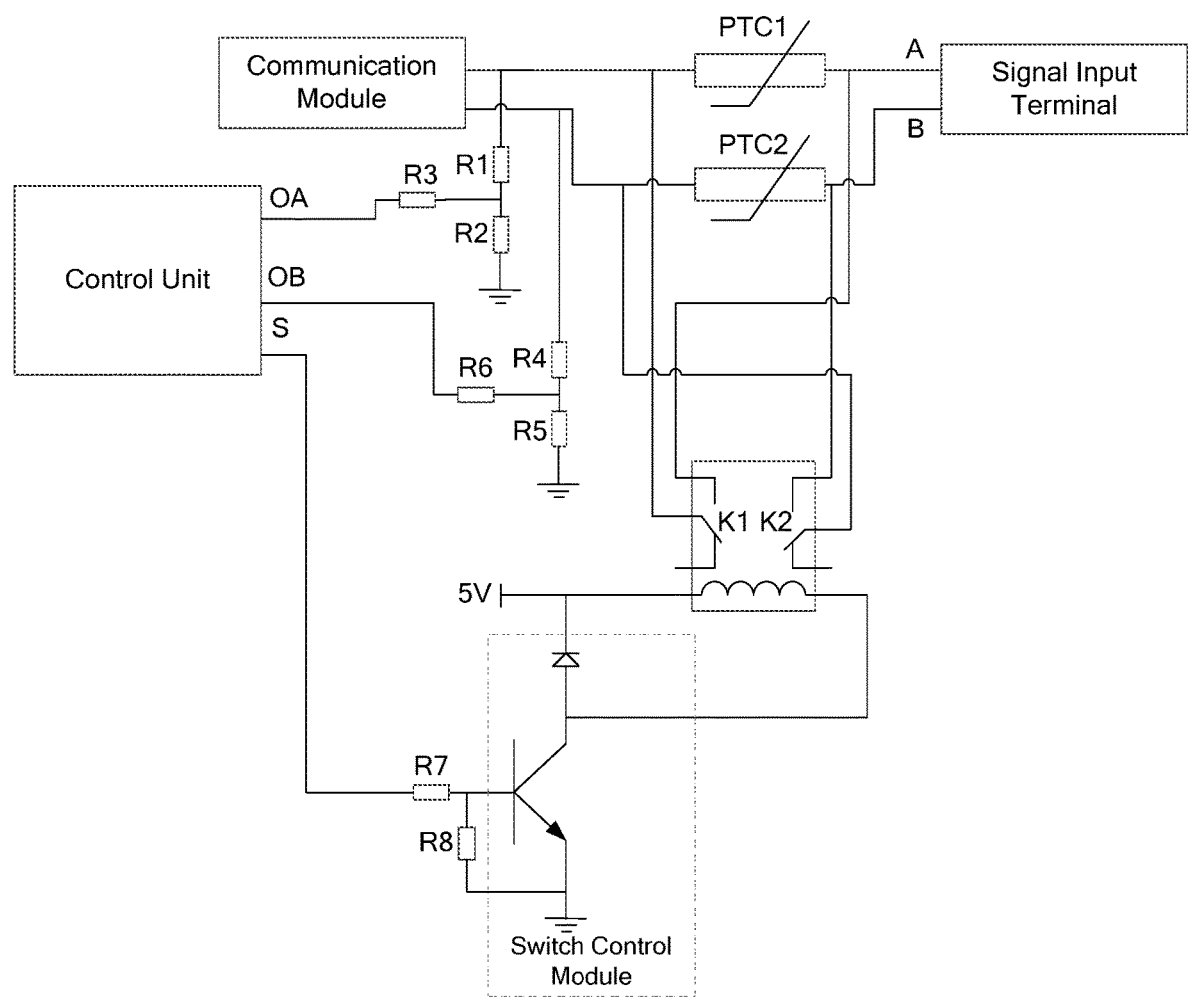
FIG. 4 is another schematic structural diagram of a protection circuit according to an embodiment of the present disclosure.

In the foregoing, a single line is used to detect the communication signal. In the embodiment of the present disclosure, multiple lines may also be used to detect the communication signal. Specifically, FIG. 4 is another schematic structural diagram of a protection circuit according to an embodiment of the present disclosure. As shown in FIG. 4, in the protection circuit in the embodiment of the present disclosure, based on the foregoing, the positive temperature coefficient thermistor includes a first positive temperature coefficient thermistor PTC1 and a second positive temperature coefficient thermistor PTC2; the switch includes a first switch K1 and a second switch K2; the signal input terminal includes a first signal input terminal A and a second signal input terminal B; and the signal detection interface includes a first signal detection interface OA and a second signal detection interface OB.

A first end of the first positive temperature coefficient thermistor PTC1 is connected to the first signal input terminal A, and a second end of the first positive temperature coefficient thermistor PTC1 is connected to the first signal detection interface OA; a first end of the second positive temperature coefficient thermistor PTC2 is connected to the second signal input terminal B, and a second end of the second positive temperature coefficient thermistor PTC2 is connected to the second signal detection interface OB; a first end of the first switch K1 is connected to the first end of the first positive temperature coefficient thermistor PTC1, a second end of the first switch K1 is connected to a second end of the first positive temperature coefficient thermistor PTC1, and a third end of the first switch K1 is connected to the control signal output interface S; a first end of the second switch K2 is connected to the first end of the second positive temperature coefficient thermistor PTC2, a second end of the second switch K2 is connected to a second end of the second positive temperature coefficient thermistor PTC2, and a third end of the second switch K2 is connected to the control signal output interface S.

The implementation principle of the circuit shown in FIG. 4 is the same as that of the circuit shown in FIG. 3, and is not described here. The difference is that, in the embodiment of the present disclosure, the communication signal is detected simultaneously through the first signal detection interface OA and the second signal detection interface OB, at this time, the control unit may determine whether a signal input by the signal input terminal is a pulse signal according to the communication signal detected simultaneously through the first signal detection interface OA and the second signal detection interface OB. When it is determined that the signal is the pulse signal, the control unit outputs a signal for controlling the switch to be switched on through the control signal output interface S, at this time, the first switch K1 and the second switch K2 are simultaneously switched on; and when the first signal detection interface OA and the second signal detection interface OB in the control unit do not detect the communication signal, the control unit outputs a signal for controlling the switch to be switched off through the control signal output interface S, at this time, the first switch K1 and the second switch K2 are simultaneously switched off, to ensure that the PTC1 and the PTC2 work normally.

Since the control unit mostly is in a low voltage or a low current working state, and the signal output from the control signal output interface S is also a lower voltage signal, in the embodiment of the present disclosure, the signal output from the control signal output interface S may be amplified by a switch control module, so as to control the switch to work. Specifically, the switch control module is disposed between the control signal output interface and the third end of the switch.

The switch control module is configured to output a signal for controlling the switch to be switched on when receiving the signal for controlling the switch to be switched on output by the control signal output interface S; and the switch control module is configured to output a signal for controlling the switch to be switched off when receiving the signal for controlling the switch to be switched off output by the control signal output interface S.

In a specific implementation process, the switch control module includes: a triode and a diode, wherein a first end of the triode is connected to the control signal output interface S; a second end of the triode is grounded; a third end of the triode is connected to a second end of the diode; and a first end of the diode is connected to the third end of the switch. In the embodiment of the present disclosure, the second end of the diode is further provided with a reference voltage of 5V, which may also be other reference voltage values in practical application. In the embodiment of the present disclosure, the first switch K1 and the second switch K2 are in an off state by default, when the switch needs to be switched on, the control signal output interface S outputs a low level signal, which is input to the first end of the triode, a voltage of the first end of the triode is higher than a voltage of 0V at the third end of the triode, the triode is turned on, and then the level signal amplified by the triode is input to the second end of the diode, a reference voltage corresponding to the first end of the diode is 5V, a difference between a voltage value of the level signal amplified by the triode and a voltage value of the reference voltage cannot make the diode to be turned on, coils at the third end of the switch stop generating a magnetic induction signal, and the first switch K1 and the second switch K2 are simultaneously switched on. When the switch needs to be switched off, the control signal output interface S outputs a high level signal, which is input to the first end of the triode, the voltage at the first end of the triode is higher than the voltage of 0V at the third end of the triode, the triode is turned on, and then the level signal amplified by the triode is input to the second end of the diode, the reference voltage corresponding to the first end of the diode is 5V, the difference between the voltage value of the level signal amplified by the triode and the voltage value of the reference voltage enables the diode to be turned on, the coils at the third end of the switch generate the magnetic induction signal, and the first switch K1 and the second switch K2 are simultaneously switched off.

As shown in FIG. 4, the protection circuit in the embodiment of the present disclosure further includes a first resistor R1, a second resistor R2 and a third resistor R3, wherein a first end of the first resistor R1 is connected to the second end of the first positive temperature coefficient thermistor PTC1; a second end of the first resistor R1 is connected to a first end of the second resistor R2; a second end of the second resistor R2 is grounded; the second end of the second resistor R2 is further connected to a first end of the third resistor R3; and a second end of the third resistor R3 is connected to the first signal detection interface OA. The first resistor R1 and the third resistor R3 play a role of voltage division, and the second resistor R2 plays a role of protection.

As shown in FIG. 4, the protection circuit in the embodiment of the present disclosure further includes a fourth resistor R4, a fifth resistor R5 and a sixth resistor R6, wherein a first end of the fourth resistor R4 is connected to the second end of the second positive temperature coefficient thermistor PTC2; a second end of the fourth resistor R4 is connected to a first end of the fifth resistor R5; a second end of the fifth resistor R5 is grounded; the second end of the fifth resistor R5 is further connected to a first end of the sixth resistor R6; a second end of the sixth resistor R6 is connected to the second signal detection interface OB. The fourth resistor R4 and the sixth resistor R6 play a role of voltage division, and the fifth resistor R5 plays a role of protection.

As shown in FIG. 4, the protection circuit in the embodiment of the present disclosure further includes a seventh resistor R7, wherein a first end of the seventh resistor R7 is connected to the control signal output interface S, and a second end of the seventh resistor R7 is connected to the first end of the triode. In the embodiment of the present disclosure, the seventh resistor R7 plays a role of voltage division.

As shown in FIG. 4, the protection circuit in the embodiment of the present disclosure further includes an eighth resistor R8, wherein a first end of the eighth resistor R8 is connected to the first end of the triode, and a second end of the eighth resistor R8 is grounded. In the embodiment of the present disclosure, the eighth resistor R8 plays a role of protection.

The circuit in the foregoing is a circuit required for protecting internal components of the air conditioner. Therefore, the embodiment of the present disclosure further provides an air conditioner, including any one of protection circuits in the foregoing. The implementation principle and the technical effects are shown in the foregoing, and are not described here.

The apparatus embodiment described above is merely schematic, where the units described as separate components may or may not be physically separate, and the components displayed as units may or may not be physical units, that is, they may be located at a same place, or may also be distributed on at least two network units. Some or all of the modules may be selected according to an actual requirement, to achieve the objective of the solution of the present embodiment. Those of ordinary skill in the art may understand and implement the present disclosure without creative efforts.

Finally, it should be noted that the foregoing embodiments are merely intended for describing the technical solutions of the present disclosure, but not for limiting the present disclosure. Although the present disclosure is described in detail with reference to the foregoing embodiments, those of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:
1. A protection circuit, comprising:
   a positive temperature coefficient thermistor;
   a signal input terminal, configured to electrically connect to a communication line; and
   a communication module;

wherein a first end of the positive temperature coefficient thermistor is connected to the signal input terminal, and a second end of the positive temperature coefficient thermistor is connected to the communication module;

wherein the positive temperature coefficient thermistor allows for normal current flow between the signal input terminal and the communication module when the signal input terminal is connected to a communication line;

wherein the positive temperature coefficient thermistor blocks abnormal current flow between the signal input terminal and the communication module when the signal input terminal is mistakenly connected to a power line;

wherein the power line provides power to a unit and has a higher voltage and current than the communication line.

2. The protection circuit according to claim 1, wherein the protection circuit further comprises:
a control unit comprising a signal detection interface and a control signal output interface; and
a switch;
wherein a first end of the switch is connected to the first end of the positive temperature coefficient thermistor, a second end of the switch is connected to the second end of the positive temperature coefficient thermistor, and a third end of the switch is connected to the control signal output interface;
the second end of the positive temperature coefficient thermistor is connected to the signal detection interface;
the control signal output interface outputs a signal for controlling the switch to be switched on when the signal detection interface detects a communication signal;
the control signal output interface outputs a signal for controlling the switch to be switched off when the signal detection interface does not detect the communication signal.

3. The protection circuit according to claim 2, wherein the positive temperature coefficient thermistor comprises a first positive temperature coefficient thermistor and a second positive temperature coefficient thermistor;
the switch comprises a first switch and a second switch;
the signal input terminal comprises a first signal input terminal and a second signal input terminal; the signal detection interface comprises a first signal detection interface and a second signal detection interface;
a first end of the first positive temperature coefficient thermistor is connected to the first signal input terminal, and a second end of the first positive temperature coefficient thermistor is connected to the first signal detection interface; a first end of the second positive temperature coefficient thermistor is connected to the second signal input terminal, and a second end of the second positive temperature coefficient thermistor is connected to the second signal detection interface;
a first end of the first switch is connected to the first end of the first positive temperature coefficient thermistor, a second end of the first switch is connected to the second end of the first positive temperature coefficient thermistor, and a third end of the first switch is connected to the control signal output interface;
a first end of the second switch is connected to the first end of the second positive temperature coefficient thermistor, a second end of the second switch is connected to the second end of the second positive temperature coefficient thermistor, and a third end of the second switch is connected to the control signal output interface.

4. The protection circuit according to claim 3, wherein the protection circuit further comprises: a first resistor, a second resistor and a third resistor;
a first end of the first resistor is connected to the second end of the first positive temperature coefficient thermistor;
a second end of the first resistor is connected to a first end of the second resistor;
a second end of the second resistor is grounded;
the second end of the second resistor is further connected to a first end of the third resistor;
a second end of the third resistor is connected to the first signal detection interface.

5. The protection circuit according to claim 3, wherein the protection circuit further comprises: a fourth resistor, a fifth resistor and a sixth resistor;
a first end of the fourth resistor is connected to the second end of the second positive temperature coefficient thermistor;
a second end of the fourth resistor is connected to a first end of the fifth resistor;
a second end of the fifth resistor is grounded;
the second end of the fifth resistor is further connected to a first end of the sixth resistor;
a second end of the sixth resistor is connected to the second signal detection interface.

6. The protection circuit according to claim 2, wherein a switch control module is disposed between the control signal output interface and the third end of the switch;
the switch control module is configured to output a signal for controlling the switch to be switched on when receiving a signal for controlling the switch to be switched on output by the control signal output interface;
the switch control module is configured to output a signal for controlling the switch to be switched off when receiving a signal for controlling the switch to be switched off output by the control signal output interface.

7. The protection circuit according to claim 6, wherein the switch control module comprises: a triode and a diode; a first end of the triode is connected to the control signal output interface; a second end of the triode is grounded; a third end of the triode is connected to a second end of the diode; a first end of the diode is connected to the third end of the switch.

8. The protection circuit according to claim 7, wherein the protection circuit further comprises: a seventh resistor;
a first end of the seventh resistor is connected to the control signal output interface;
a second end of the seventh resistor is connected to the first end of the triode.

9. The protection circuit according to claim 7, wherein the protection circuit further comprises: an eighth resistor;
a first end of the eighth resistor is connected to the first end of the triode;
a second end of the eighth resistor is grounded.

10. An air conditioner, comprising: a protection circuit;
wherein the protection circuit comprises:
a positive temperature coefficient thermistor;
a signal input terminal, configured to electrically connect to a communication line; and
a communication module;
wherein a first end of the positive temperature coefficient thermistor is connected to the signal input terminal, and a second end of the positive temperature coefficient thermistor is connected to the communication module;

wherein the positive temperature coefficient thermistor allows for normal current flow between the signal input terminal and the communication module when the signal input terminal is connected to a communication line;

wherein the positive temperature coefficient thermistor blocks abnormal current flow between the signal input terminal and the communication module when the signal input terminal is mistakenly connected to a power line;

wherein the power line provides power to an air conditioning unit and has a higher voltage and current than the communication line.

11. The air conditioner according to claim 10, wherein the protection circuit further comprises:

a control unit comprising a signal detection interface and a control signal output interface; and a switch;

wherein a first end of the switch is connected to the first end of the positive temperature coefficient thermistor, a second end of the switch is connected to the second end of the positive temperature coefficient thermistor, and a third end of the switch is connected to the control signal output interface;

the second end of the positive temperature coefficient thermistor is connected to the signal detection interface;

the control signal output interface outputs a signal for controlling the switch to be switched on when the signal detection interface detects a communication signal;

the control signal output interface outputs a signal for controlling the switch to be switched off when the signal detection interface does not detect the communication signal.

12. The air conditioner according to claim 11, wherein the positive temperature coefficient thermistor comprises a first positive temperature coefficient thermistor and a second positive temperature coefficient thermistor;

the switch comprises a first switch and a second switch;

the signal input terminal comprises a first signal input terminal and a second signal input terminal; the signal detection interface comprises a first signal detection interface and a second signal detection interface;

a first end of the first positive temperature coefficient thermistor is connected to the first signal input terminal, and a second end of the first positive temperature coefficient thermistor is connected to the first signal detection interface; a first end of the second positive temperature coefficient thermistor is connected to the second signal input terminal, and a second end of the second positive temperature coefficient thermistor is connected to the second signal detection interface; a first end of the first switch is connected to the first end of the first positive temperature coefficient thermistor, a second end of the first switch is connected to the second end of the first positive temperature coefficient thermistor, and a third end of the first switch is connected to the control signal output interface;

a first end of the second switch is connected to the first end of the second positive temperature coefficient thermistor, a second end of the second switch is connected to the second end of the second positive temperature coefficient thermistor, and a third end of the second switch is connected to the control signal output interface.

13. The air conditioner according to claim 12, wherein the protection circuit further comprises: a first resistor, a second resistor and a third resistor;

a first end of the first resistor is connected to the second end of the first positive temperature coefficient thermistor;

a second end of the first resistor is connected to a first end of the second resistor;

a second end of the second resistor is grounded;

the second end of the second resistor is further connected to a first end of the third resistor;

a second end of the third resistor is connected to the first signal detection interface.

14. The air conditioner according to claim 12, wherein the protection circuit further comprises: a fourth resistor, a fifth resistor and a sixth resistor;

a first end of the fourth resistor is connected to the second end of the second positive temperature coefficient thermistor;

a second end of the fourth resistor is connected to a first end of the fifth resistor;

a second end of the fifth resistor is grounded;

the second end of the fifth resistor is further connected to a first end of the sixth resistor;

a second end of the sixth resistor is connected to the second signal detection interface.

15. The air conditioner according to claim 11, wherein a switch control module is disposed between the control signal output interface and the third end of the switch;

the switch control module is configured to output a signal for controlling the switch to be switched on when receiving a signal for controlling the switch to be switched on output by the control signal output interface;

the switch control module is configured to output a signal for controlling the switch to be switched off when receiving a signal for controlling the switch to be switched off output by the control signal output interface.

16. The protection circuit according to claim 15, wherein the switch control module comprises: a triode and a diode; a first end of the triode is connected to the control signal output interface; a second end of the triode is grounded; a third end of the triode is connected to a second end of the diode; a first end of the diode is connected to the third end of the switch.

17. The protection circuit according to claim 16, wherein the protection circuit further comprises: a seventh resistor; a first end of the seventh resistor is connected to the control signal output interface; a second end of the seventh resistor is connected to the first end of the triode.

18. The protection circuit according to claim 16, wherein the protection circuit further comprises: an eighth resistor; a first end of the eighth resistor is connected to the first end of the triode; a second end of the eighth resistor is grounded.

* * * * *